US010013543B2

(12) United States Patent
Walsh et al.

(10) Patent No.: US 10,013,543 B2
(45) Date of Patent: *Jul. 3, 2018

(54) SYSTEM AND DEVICE BINDING METADATA WITH HARDWARE INTRINSIC PROPERTIES

(71) Applicant: Analog Devices, Inc., Norwood, MA (US)

(72) Inventors: John J. Walsh, Tampa, FL (US); John Ross Wallrabenstein, West Lafayette, IN (US)

(73) Assignee: Analog Devices, Inc., Norwood, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/614,367

(22) Filed: Jun. 5, 2017

(65) Prior Publication Data

US 2017/0270288 A1    Sep. 21, 2017

Related U.S. Application Data

(63) Continuation of application No. 14/704,963, filed on May 5, 2015, now Pat. No. 9,672,342.

(Continued)

(51) Int. Cl.
*H04L 9/32* (2006.01)
*G06F 21/32* (2013.01)
*H04L 9/30* (2006.01)

(52) U.S. Cl.
CPC ............ *G06F 21/32* (2013.01); *H04L 9/3066* (2013.01); *H04L 9/3218* (2013.01);
(Continued)

(58) Field of Classification Search
None
See application file for complete search history.

(56) References Cited

U.S. PATENT DOCUMENTS 6,501,390 B1    12/2002    Chainer et al.
7,564,345 B2    7/2009    Devedas et al.
(Continued)

FOREIGN PATENT DOCUMENTS

EP    2 320 344 A2    7/2011
KR    20090104421 A    10/2009
(Continued)

OTHER PUBLICATIONS

Duren et al, "Resilient Device Authentication System (RDAS) through SIOMETRICS", Oct. 30-Nov. 1, 2012, Eighth Annual Cyber Security and Information Intelligence Workshop, ACM, p. 1-4.*

(Continued)

*Primary Examiner* — Christopher Revak
(74) *Attorney, Agent, or Firm* — Wolf, Greenfield & Sacks, P.C.

(57) ABSTRACT

A system, device, and method for binding metadata, such as information derived from the output of a biometric sensor, to hardware intrinsic properties by obtaining authentication-related metadata and combining it with information pertaining to a root of trust, such as a physical unclonable function. The metadata may be derived from a sensor such as a biometric sensor, the root of trust may be a physical unclonable function, the combination of the metadata and root of trust information may employ a hash function, and output from such a hash process may he used as an input to the root of trust. The combined information can he used in interactive or non-interactive authentication.

20 Claims, 2 Drawing Sheets

Related U.S. Application Data

(60) Provisional application No. 62/017,045, filed on Jun. 25, 2014, provisional application No. 61/988,848, filed on May 5, 2014.

(52) U.S. Cl.
CPC .......... *H04L 9/3221* (2013.01); *H04L 9/3226* (2013.01); *H04L 9/3231* (2013.01); *H04L 9/3236* (2013.01); *H04L 9/3278* (2013.01); *H04L 9/3297* (2013.01); *H04L 2209/805* (2013.01)

(56) References Cited

U.S. PATENT DOCUMENTS

| | | |
|---|---|---|
| 7,581,248 B2 | 8/2009 | Atkins et al. |
| 7,653,197 B2 | 1/2010 | Van Dijk |
| 7,702,927 B2 | 4/2010 | Devedas et al. |
| 7,839,278 B2 | 11/2010 | Devedas et al. |
| 7,926,089 B2 | 4/2011 | Tulshibagwale et al. |
| 7,962,516 B2 | 6/2011 | Bahrs et al. |
| 8,032,760 B2 | 10/2011 | Tuyls et al. |
| 8,281,127 B2 | 10/2012 | Hayes |
| 8,290,150 B2 | 10/2012 | Erhart et al. |
| 8,346,951 B2 | 1/2013 | Hayes |
| 8,379,856 B2 | 2/2013 | Potkonjak |
| 8,386,990 B1 | 2/2013 | Trimberger et al. |
| 8,418,006 B1 | 4/2013 | Trimberger et al. |
| 8,446,250 B2 | 5/2013 | Kursawe et al. |
| 8,458,489 B2 | 6/2013 | Beckmann et al. |
| 8,463,813 B2 | 6/2013 | Siress et al. |
| 8,468,186 B2 | 6/2013 | Yu |
| 8,510,608 B2 | 8/2013 | Futa et al. |
| 8,516,269 B1 | 8/2013 | Hamlet et al. |
| 8,525,169 B1 | 9/2013 | Edelstein et al. |
| 8,566,579 B2 | 10/2013 | Armstrong et al. |
| 8,577,091 B2 | 11/2013 | Ivanov et al. |
| 8,625,788 B2 | 1/2014 | Pendakur et al. |
| 8,667,265 B1 | 3/2014 | Hamlet et al. |
| 8,752,155 B2 | 6/2014 | Lauper |
| 8,782,396 B2 | 7/2014 | Ziola et al. |
| 8,844,009 B2 | 9/2014 | Walsh et al. |
| 8,848,905 B1 | 9/2014 | Hamlet et al. |
| 8,868,923 B1 | 10/2014 | Hamlet et al. |
| 8,912,817 B2 | 12/2014 | Wang et al. |
| 8,918,647 B1 | 12/2014 | Wallrabenstein |
| 8,995,660 B2 | 3/2015 | Kobayashi et al. |
| 9,018,972 B1 | 4/2015 | Gurrieri et al. |
| 9,032,476 B2 | 5/2015 | Potkonjak |
| 9,038,133 B2 * | 5/2015 | Chellappa ............... G06F 21/44 726/2 |
| 9,158,906 B2 | 10/2015 | Guajardo Merchan et al. |
| 9,225,512 B1 | 12/2015 | Trimberger |
| 9,292,692 B2 | 3/2016 | Wallrabenstein |
| 9,672,342 B2 * | 6/2017 | Walsh ...................... G06F 21/32 |
| 9,681,302 B2 * | 6/2017 | Robinton ............. H04W 12/10 |
| 9,690,927 B2 * | 6/2017 | Chellappa ............... G06F 21/44 |
| 9,705,854 B2 | 7/2017 | Khazan et al. |
| 9,715,590 B2 | 7/2017 | Gardner et al. |
| 9,806,718 B2 | 10/2017 | Wallrabenstein |
| 2003/0081785 A1 | 5/2003 | Boneh |
| 2003/0204743 A1 | 10/2003 | Devadas et al. |
| 2005/0149496 A1 | 7/2005 | Mukherjee et al. |
| 2005/0222896 A1 | 10/2005 | Rhyne et al. |
| 2006/0023887 A1 | 2/2006 | Agrawal et al. |
| 2006/0045262 A1 | 3/2006 | Orlando |
| 2006/0210082 A1 | 9/2006 | Devadas et al. |
| 2007/0036353 A1 | 2/2007 | Reznik et al. |
| 2007/0044139 A1 | 2/2007 | Tuyls et al. |
| 2007/0206786 A1 | 9/2007 | Chakraborty |
| 2008/0069341 A1 | 3/2008 | Relyea |
| 2008/0133912 A1 | 6/2008 | Yamamoto et al. |
| 2008/0181398 A1 | 7/2008 | Pappu |
| 2008/0256549 A1 | 10/2008 | Liu et al. |
| 2008/0256600 A1 | 10/2008 | Schrijen et al. |
| 2009/0063860 A1 | 3/2009 | Barnett et al. |
| 2009/0083833 A1 | 3/2009 | Ziola et al. |
| 2010/0037056 A1 | 2/2010 | Follis et al. |
| 2010/0122093 A1 * | 5/2010 | Tuyls ...................... G06F 21/33 713/180 |
| 2010/0127822 A1 | 5/2010 | Devedas |
| 2010/0176920 A1 | 7/2010 | Kursawe et al. |
| 2010/0272255 A1 | 10/2010 | Devedas et al. |
| 2010/0293384 A1 | 11/2010 | Potkonjak |
| 2010/0293612 A1 | 11/2010 | Potkonjak |
| 2011/0002461 A1 | 1/2011 | Erhart et al. |
| 2011/0033041 A1 | 2/2011 | Yu et al. |
| 2011/0099117 A1 | 4/2011 | Schepers et al. |
| 2011/0113392 A1 | 5/2011 | Chakraborty et al. |
| 2011/0138475 A1 | 6/2011 | Gordon et al. |
| 2011/0191837 A1 | 8/2011 | Guajardo Merchan et al. |
| 2011/0215829 A1 | 9/2011 | Guajardo Merchan et al. |
| 2011/0299678 A1 | 12/2011 | Deas et al. |
| 2012/0072717 A1 | 3/2012 | Hayes |
| 2012/0072737 A1 | 3/2012 | Schrijen et al. |
| 2012/0124385 A1 | 5/2012 | Klasen et al. |
| 2012/0131340 A1 | 5/2012 | Teuwen et al. |
| 2012/0137137 A1 | 5/2012 | Brickell et al. |
| 2012/0183135 A1 | 7/2012 | Paral et al. |
| 2012/0233674 A1 | 9/2012 | Gladstone et al. |
| 2012/0321077 A1 | 12/2012 | Shiota et al. |
| 2013/0046990 A1 | 2/2013 | Fahrny et al. |
| 2013/0051552 A1 | 2/2013 | Handschuh et al. |
| 2013/0094649 A1 | 4/2013 | Tomlinson et al. |
| 2013/0114810 A1 | 5/2013 | Kobayashi et al. |
| 2013/0138710 A1 | 5/2013 | Yamamoto et al. |
| 2013/0142329 A1 | 6/2013 | Bell et al. |
| 2013/0198838 A1 | 8/2013 | Schmidt et al. |
| 2013/0246809 A1 | 9/2013 | Beckmann et al. |
| 2014/0047565 A1 * | 2/2014 | Baek ...................... G06F 21/44 726/30 |
| 2014/0093074 A1 | 4/2014 | Gotze et al. |
| 2014/0108786 A1 * | 4/2014 | Kreft ...................... G06F 21/71 713/156 |
| 2014/0140513 A1 | 5/2014 | Brightley et al. |
| 2014/0189890 A1 | 7/2014 | Koeberl et al. |
| 2014/0205089 A1 | 7/2014 | Irwin |
| 2014/0279532 A1 | 9/2014 | Tremlet |
| 2015/0058928 A1 | 2/2015 | Guo et al. |
| 2015/0071432 A1 | 3/2015 | Zhu et al. |
| 2015/0095655 A1 | 4/2015 | Sherman |
| 2015/0134966 A1 | 5/2015 | Wallrabenstein |
| 2015/0143130 A1 | 5/2015 | Ducharme et al. |
| 2015/0195088 A1 | 7/2015 | Rostami et al. |
| 2015/0234751 A1 | 8/2015 | Van der Sluis et al. |
| 2015/0242620 A1 * | 8/2015 | Newell ................... G06F 21/44 726/30 |
| 2015/0278505 A1 | 10/2015 | Lu et al. |
| 2015/0317480 A1 | 11/2015 | Gardner et al. |
| 2015/0317481 A1 | 11/2015 | Wallrabenstein |
| 2015/0318994 A1 | 11/2015 | Walsh et al. |
| 2015/0341792 A1 | 11/2015 | Wallrabenstein et al. |
| 2016/0021096 A1 | 1/2016 | Wallrabenstein |
| 2016/0170907 A1 | 6/2016 | Walsh et al. |
| 2016/0261409 A1 | 9/2016 | French et al. |
| 2016/0269186 A1 | 9/2016 | Wallrabenstein |
| 2016/0378983 A1 * | 12/2016 | Spurlock ............... G06F 21/567 726/23 |
| 2017/0063559 A1 | 3/2017 | Wallrabenstein et al. |
| 2017/0149572 A1 | 5/2017 | Wallrabenstein |

FOREIGN PATENT DOCUMENTS

| | | | |
|---|---|---|---|
| WO | WO 2010/105993 A2 | 9/2010 | |
| WO | WO 2014/037812 A1 * | 3/2014 | ............ H04W 12/06 |
| WO | WO 2015/200196 A1 | 12/2015 | |
| WO | WO 2016/141386 A1 | 9/2016 | |

OTHER PUBLICATIONS

Zhao et al, Providing Root of Trust for ARM TrustZone using On-Chip SRAM, Nov. 3, 2014, TrustED '14, ACM, p. 25-36.*

(56) References Cited

OTHER PUBLICATIONS

Sadeghi et al, "Short Paper: Lightweight Remote Attestation using Physical Functions", Jun. 14-17, 2011, WiSec '11, ACM, p. 109-114.*
Eiroa, "Hardware authentication based on PUFs and SHA-3 2nd round candidates", 2009 IEEE, p. 1-4.*
Shpantzer, "Implementing Hardware Roots of Trust: The Trusted Platform Module Comes of Age", Jun. 2013, A SANS Whitepaper, p. 1-17.*
Frikken et al, "Robust Authentication Using Physically Unclonable Functions", 2009, p. 1-16.*
International Search Report and Written Opinion dated Sep. 16, 2015 for Application No. PCT/US2015/036937.
International Preliminary Report on Patentability dated Jun. 16, 2016 for Application No. PCT/US2015/036937.
International Search Report and Written Opinion dated Jun. 3, 2016 for Application No. PCT/US2016/021264.
International Search Report and Written Opinion dated Jun. 3, 2016 for Application No. PCT/US2016/021275.
[No Author Listed], D6.5: Publishable Summary. HINT. Seventh Framework Programme. Project 317930. Dec. 11, 2013. 5 pages.
Abe et al., Adaptively Secure Feldman VSS and Applications to Universally-Composable Threshold Cryptography. Advances in Cryptology. CRYPTO 2004. 2004;3152:317-34.
Abercrombie et al., Secure Cryptographic Key Management System (CKMS) Considerations for Smart Grid Devices. CSIIRW '11 Proceedings of the Seventh Annual Workshop on Cyber Security and Information Intelligence Research, Oak Ridge, TN. Article No. 59. Oct. 12-14, 2011. 4 pages.
Al Ibrahim et al., Cyber-Physical Security Using System-Level PUFs. 7th International IEEE Wireless Communications and Mobile Computing Conference (IWCMC). 2011. 5 pages.
Armknecht et al., A Formal Foundation for the Security Features of Physical Functions. Proceedings of the 2011 IEEE Symposium on Security and Privacy, SP '11. 2011;397-412.
Asaeda et al., Structuring Proactive Secret Sharing in Mobile Ad-hoc Networks. 2006 1st International Symposium on Wireless Pervasive Computing. Jan. 18, 2006. 6 pages.
Asim et al., Physical Unclonable Functions and Their Applications to Vehicle System Security. Vehicular Technology Conference, VTC Spring 2009. 10 pages.
Becker et al., Stealthy Dopant-Level Hardware Trojans. Crytographic Hardware and Embedded Systems, CHES 2013. 2013;8086:197-214. 18 pages.
Bilgin et al., A More Efficient AES Threshold Implementation. Cryptology ePrint Archive. Report 2013/967. 2013. 17 pages.
Blakley, Safeguarding cryptographic keys. Proceedingsof the 1979 AFIPS National Computer Conference. 1979;313-7.
Brzuska et al., Physically Uncloneable Functions in the Universal Composition Framework. Advances in Cryptology—CRYPTO 2011—31st Annual Cryptology Conference. 2011;6841:51-70.
Changgen et al., Threshold Signcryption Scheme Based on Elliptic Curve Cryptosystem and Verifiable Secret Sharing. International Conference on Wireless Communications, Networking and Mobile Computing. 2005;2:1136-9.
Chen et al., An efficient threshold group signature scheme. IEEE Region 10 Conference TENCON. 2004;2(B):13-6.
Coron, Resistance Against Differential Power Analysis for Elliptic Curve Cryptosystems. Crytpographic Hardware and Embedded Systems. 1999;1717:292-302.
Dodis et al., Fuzzy Extractors: How to Generate Strong Keys from Biometrics and Other Noisy Data. EUROCRYPT 2004. 2004;3027:523-40.
Duc et al., A survey on RFID security and provably secure grouping-proof protocols. Int J Internet Tech Secured Trans. 2010;2(3/4):222-249.
Dwoskin et al., Hardware-rooted Trust for Secure Key Management and Transient Trust. Proceedings of the 14th ACM Conference: Computer & Communications Security. Nov. 2, 2007;389-400.

Eichhorn et al., Logically Reconfigurable PUFs: Memory-based Secure Key Storage. Proceedings of the Sixth ACM Workshop on Scalable Trusted Computing, STC '11. Oct. 17, 2011;59-64. 6 pages.
Ertaul et al., ECC Based Threshold Cryptography for Secure Data Forwarding and Secure Key Exchange in MANET (I). Networking 2005, Networking Technologies, Services, and Protocols; Performance of Computer and Communication Networks; Mobile and Wireless Communications Systems. 2005;3462:102-13.
Feiri et al., Efficient and Secure Storage of Private Keys for Pseudonymous Vehicular Communication. ACM CyCAR '13. Nov. 4, 2013;9-18.
Feldman, A Practical Scheme for Non-interactive Verifiable Secret Sharing. Proceedings of the 28th Annual Symposium on Foundations of Computer Science, SFCS '87. 1987;427-37.
Frankel et al., Optimal-Resilience Proactive Public-Key Cryptosystems. 38th Annual Symposium on Foundations of Computer Science. 1997;384-93. 12 pages.
Frikken et al., Robust Authentication using Physically Unclonable Functions. Information Security, ISC. 2009;5735:262-77.
Garcia-Alfaro et al., Security Threat Mitigation Trends in Low-cost RFID Systems. Data Privacy Management and Autonomous Spontaneous Security. 2010. 15 pages.
Gardner et al., Toward Trusted Embedded Systems. 2nd Annual NSA Trusted Computing Conference and Exposition. Orlando, FL. Sep. 20, 2011. 25 pages.
Gassend et al., Silicon Physical Random Functions. Proceedings of the 9th ACM Conference on Computer and Communications Security, CCS '02. 2002;148-60.
Gennaro et al., Secure Applications of Pedersen's Distributed Key Generation Protocol. Topics in Cryptology. CT-RSA 2003. 2003;2612:373-90.
Gennaro et al., Secure Distributed Key Generation for Discrete-Log Based Cryptosystems. Advances in Cryptology. EUROCRYPT 99. 1999;1592:295-310. 15 pages.
Goldwasser et al., One-time programs, Proceedings of the 28th Annual conference on Cryptology: Advances in Cryptology. CRYPTO 2008. 2008;39-56.
Guajardo et al., FPGA intrinsic PUFs and Their Use for IP Protection. Proceedings of the 9th Cryptographic Hardware and Embedded Systems Workshop (CHES). 2007;4727. 22 pages.
Guajardo et al., Physical Unclonable Functions and Public-Key Crypto for FPGA IP Protection. International Conference on Field Programmable Logic and Applications. 2007. 8 pages.
Handschuh et al., Hardware Intrinsic Security from Physically Unclonable Functions. Towards Hardware-Intrinsic Security, Information Security and Cryptography. 2010;39-53.
Herzberg et al., Proactive Public Key and Signature Systems. Proceedings of the 4th ACM Conference on Computer and Communications Security. CCS '97. 1997;100-10. 11 pages.
Herzberg et al., Proactive Secret Sharing or: How to Cope With Perpetual Leakage. Advances in Cryptology. CRYPTO 95. 1995;963:339-52.
Holcomb et al., Initial SRAM State as a Fingerprint and Source of True Random Numbers for RFID Tags. Proceedings of the Conference on RFID Security. 2007. 12 pages.
Hori et al., Quantitative and Statistical Performance Evaluation of Arbiter Physical Unclonable Functions on FPGAs. 2010 International Conference on Reconfigurable Computing and FPGAs (ReCon-Fiq). 2010;298-303. 6 pages.
Horstmeyer et al., Physically secure and fully reconfigurable data storage using optical scattering. IEEE International Symposium on Hardware Oriented Security and Trust (HOST). 2015;157-62. 6 pages.
Huang et al., To verify embedded system software integrity with TCM and FPGA. IEEE. Aug. 2010;65-70.
Hua-Qun et al., Verifiable (t, n) Threshold Signature Scheme based on Elliptic Curve. Wuhan Univ J Nat Sci. 2005;10(1):165-8.
Ibrahim et al., A Robust Threshold Elliptic Curve Digital Signature Providing a New Verifiable Secret Sharing Scheme. IEEE 46th Midwest Symposium on Circuits and Systems. 2003;1:276-80. 5 pages.

(56) References Cited

OTHER PUBLICATIONS

Jarecki et al., Adaptively Secure Threshold Cryptography: Introducing Concurrency, Removing Erasures (Extended Abstract). Advances in Cryptology. EUROCRYPT 2000. 2000;1807:223-45.
Juels et al., A Fuzzy Commitment Scheme. Proceedings of the 6th ACM Conference on Computer and Communications Security, CCS '99. 1999;28-36. 9 pages.
Karakoyunlu et al., Differential template attacks on PUF enable cryptographic devices. IEEE International Workshop on Information Forensics and Security (WIFS). Dec. 12-15, 2010;1-6.
Katzenbeisser et al., PUFs: Myth, Fact or Busted? A Security Evaluation of Physically Unclonable Functions (PUFs) Cast in Silicon (Extended Version). Cryptographic Hardware and Embedded Systems—CHES '12. 2012;283-301. 18 pages.
Katzenbeisser et al., Recyclable PUFs: logically reconfigurable PUFs. J Cryto Eng. 2011;1(3):177-86. 15 pages.
Kerr et al., PEAR: A Hardware Based Protocol Authentication System. SPRINGL '10 Proceedings of the 3rd ACM 3IGSPATIAL International Workshop on Security and Privacy in GIS and LBS. 2010. 8 pages.
Kerr, Secure Physical System Design Leveraging PUF Technology. Purdue University. Thesis. May 2012. 87 pages.
Khandavilli, A Mobile Role Based Access Control System Using Identity Based Encryption With Non-Interactive zero Knowledge Proof of Authentication. Dalhousie University Repository, Faculty of Graduate Studies. Thesis. Apr. 5, 2012. 65 pages.
Khoshroo, Design and Evaluation of FPGA-Based Hybrid Physically Unclonable Functions. Thesis. Graduate Program in Electrical and Computer Engineering. Western University. London, Ontario, Canada. May 2013. 107 pages.
Kim et al., Threshold Signature Schemes for ElGamal Variants. Comp Stan Interf. 2011;33(4):432-7.
Kirkpatrick et al., Enforcing Physically Restricted Access Control for Remote Data. Proceedings of CODASPY. 2011. 10 pages.
Kirkpatrick et al., PUF ROKs: A Hardware Approach to Read-Once Keys. Proceedings of the 6th ACM Symposium on Information, Computer and Communications Security, ASIACCS '11. 2011;155-64.
Kirkpatrick et al., Software Techniques to Combat Drift in PUF-based Authentication Systems. Workshop on Secure Component and System Identification. 2010. 9 pages.
Kirkpatrick et at, Physically Restricted Authentication and Encryption for Cyber-physical Systems. DHS Workshop on Future Directions in Cyber-physical Systems Security. 2009. 5 pages.
Kish et al., Physical Uncloneable Function Hardware Keys Utilizing Kirchhoff-Law Johnson-Noise Secure Key Exchange and Noise-Based Logic. Fluctuation Noise Lett. 2013;12. 9 pages.
Kocher et al., Differential Power Analysis. Proceedings of the 19th Annual International Cryptology Conference on Advances in Cryptology, CRYPTO '99. 1999;388:97. 10 pages.
Kocher et al., Introduction to Differential Power Analysis. J Cryptogr Eng. Mar. 3, 2011;1:5-27.
Krzywiecki et al., Coalition Resistant Anonymous Broadcast Encryption Scheme Based on PUF. TRUST 2011. 2011;6740:48-62.
Krzywiecki et al., Collusion Resistant Anonymous Broadcast Encryption Scheme Based on PUF. TRUST 2011. Jun. 22-24, 2011. 93 pages.
Kumar et al., Extended abstract: The Butterfly PUF Protecting IP on Every FPGA. IEEE International Workshop on Hardware-Oriented Security and Trust. 2008;67-70. 4 pages.
Kursawe et al., Reconfigurable Physical Unclonable Functions—Enabling Technology for Tamper-Resistant Storage. 2009 IEEE International Hardware-Oriented Security and Trust, HOST '09. 2009;22-9.
Langheinrich et al., Practical Minimalist Cryptography for RFID Privacy. IEEE Sys J. Dec. 2007;1(2). 19 pages.
Langheinrich et al., RFID Privacy Using Spatially Distributed Shared Secrets. International Symposium on Ubiquitous Computing Systems (UCS). 2007;1-16.
Lao et al., Reconfigurable architectures for silicon physical unclonable functions. IEEE International Conference on Electro/Information Technology (EIT). 2011;1-7.
Lee et al., A technique to build a secret key in integrated circuits for identification and authentication applications. IEEE Symposium on VLSI Circuits: Digest of Technical Papers. 2004;176-9. 4 pages.
Libert et al., Adaptively Secure Non-interactive Threshold Cryptosystems. Automata, Languages and Programming. 2011;588-600. 23 pages.
Maes et al., Intrinsic PUFs from flip-flops on reconfigurable devices. 3rd Benelux Workshop on Information and System Security (WISSec 2008). 2008. 17 pages.
Maiti et al., Physical Unclonable Function and True Random No. Generator: a Compact and Scalable implementation. GLSVLSI '09 Proceedings of the 19th ACM Great Lakes Symposium on VLSI. 2009. 4 pages.
Maiti et al., The Impact of Aging on an FPGA-Based Physical Unclonable Function. International Conference on Field Programmable Logic and Applications (FPL). 2011;151-6.
Maiti, A Systematic Approach to Design an Efficient Physical Unclonable Function. Virginia Polytechnic Institute and State University. Dissertation. Apr. 30, 2012. 166 pages.
Majzoobi et al., Techniques for Design and Implementation of Secure Reconfigurable PUFs. ACM Trans Reconfig Tech Sys. Mar. 2009;2(1):5.1-33.
Merli et al., Semi-invasive EM Attack on FPGA RO PUFs and Countermeasures. Proceedings of the Workshop on Embedded Systems Security, WESS '11. 2011;2.1-9.
Merli et al., Side-Channel Analysis of PUFs and Fuzzy Extractors. Trust and Trustworthy Computing. 2011;6740:33-47.
Moradi et al., Pushing the Limits: A Very Compact and a Threshold Implementation of AES. Advances in Cryptology. EUROCRYPT 2011. 2011;6632:69-88.
Nabeel et al., Authentication and key management for advanced metering infrastructures utilizing physically unclonable function. IEEE Third International Conference on Smart Grid Communications (SmartGridComm). 2012;324-9. 6 pages.
Nikova et al., Threshold Implementations Against Side-Channel Attacks and Glitches. Information and Communications Security. 2006;4307:529-45. 17 pages.
Owusu et al., OASIS: On Achieving a Sanctuary for Integrity and Secrecy on Untrusted Platforms. Proceedings of the 2013 ACM SIGSAC conference on Computer & communications security. ACM. 2013;13-24. 12 pages.
Paral et al., Reliable and Efficient PUF-based Key Generation using Pattern Matching. IEEE International Symposium on Hardware-Oriented Security and Trust (HOST). 2011;128-33.
Pedersen, A Threshold Cryptosystem without a Trusted Party. Advances in Cryptology. EUROCRYPT 91. 1991;547:522-6.
Pedersen, Non-Interactive and Information-Theoretic Secure Verifiable Secret Sharing. Advances in Cryptology, CRYPTO 91. 1992;576:129-40.
Peeters et al., Towards More Secure and Reliable Access Control. Perv Comp. 2011;11(3). 8 pages.
Peeters, Security Architecture for Things That Think. Department of Electrical Engineering. Arenberg Doctoral School of Science, Engineering and Technology. Dissertation. Jun. 2012 150 pages.
Pfaffhauser, Protocols for MPC based on Unclonability. Department of Computer Science, ETH Zurich. Master Thesis. Apr. 12, 2011. 53 pages.
Potkonjak et al., Differential Public Physically Unclonable Functions: Architecture and Applications. DAC '11 Proceedings of the 48th Design Automation Conference. 2011. 7 pages.
Ravikanth, Physical one-way functions. Massachusetts Institute of Technology. Dissertation. 2001. 154 pages.
Rigaud, ed., D3.1: Report on Protocol choice and implementation. HINT. Project 317930. Aug. 4, 2014. 35 pages.
Ruan et al., Elliptic curve ElGamal Threshold-based Key Management Scheme against Compromise of Distributed RSUs for VANETs. J Info Proc. 2012;20(4). 8 pages.
Rührmair et al., Applications of High-Capacity Crossbar Memories in Cryptography. IEEE Trans Nanotechnol. May 2011;10(3):489-98.

(56) References Cited

OTHER PUBLICATIONS

Rührmair et al., Modeling Attacks on Physical Unclonable Functions. Proceedings of the 17th ACM Conference on Computer and Communications Security, CCS '10. 2010;237-49.
Rührmair et al., Power and Timing Side Channels for PUFs and their Efficient Exploitation. IACR Cryptology ePrint Archive 2013;851. 14 pages.
Rührmair et al., PUFs in Security Protocols: Attack Models and Security Evaluations. 2013 IEEE Symposium on Security and Privacy. 2013;286-300.
Rust, ed., D1.1: Report on use case and architecture requirements. Seventh Framework Programme. Holistic Approaches for Integrity of ICT-Systems. ICT-317930. Feb. 28, 2013. 50 pages.
Sadeghi et al., Short Paper: Lightweight Remote Attestation Using Physical Functions. ACM. Jun. 2011;109-14.
Sardar et al., Zero Knowledge Proof in Secret Sharing Scheme Using Elliptic Curve Cryptography. Global Trends in Computing and Communication Systems. 2012;269:220-6.
Schuster, Side-Channel Analysis of Physical Unclonable Functions (PUFs). Technische Universitat Munchen. Thesis. 2010. 57 pages.
Shamir, How to Share a Secret. Comm ACM. 1979;22(11):612-3.
Shao, Repairing Efficient Threshold Group Signature Scheme. Int J Netw Sec. Sep. 2008;7(2):218-22.
Suh et al., Aegis: A Single-Chip Secure Processor. IEEE Des Test Comp. 2007;570-80.
Suh et al., Physical Unclonable Functions for Device Authentication and Secret key Generation. Proceedings of the 44th annual Design Automation Conference, DAC '07. 2007;9-14.
Tang, ECDKG: A Distributed Key Generation Protocol Based on Elliptic Curve Discrete Logarithm. University of Southern California, Department of Computer Science. Technical Report 04-838. 2004. 20 pages.
Tuyls et al., Capacity and Examples of Template Protecting Biometric Authentication Systems. Biometric Authentication. 2004;3087:158-70. 13 pages.
Tuyls et al., Read-Proof Hardware from Protective Coatings. Proceedings of the 8th International Conference on Cryptographic Hardware and Embedded Systems. CHES '06. 2006;4249:369-83. 15 pages.
Van Dijk et al., Physical Unclonable Functions in Cryptographic Protocols: Security Proofs and Impossibility Results. Cryptolgoy ePrint Archive. Report 2012/228. Apr. 25, 2012. 36 pages.
Wu et al., On Foundation and Construction of Physical Unclonable Functions. IACR Cryptology ePrint Archive. 2010;171. 18 pages.
Yu et al., Lightweight and Secure PUF Key Storage Using Limits of Machine Learning. Proceedings of the 13th International Conference on Cryptographic Hardware and Embedded Systems, CHES '11. 2011;6917:358-73.
Yu et al., Recombination of Physical Unclonable Functions. GOMACTech. 2010. 4 pages.
Yu et al., Secure and robust error correction for physical unclonable functions. IEEE Des Test. Jan. 2010;27(1):48-65.
Zhang et al., Exploiting Process Variation and Programming Sensitivity of Phase Change Memory for Reconfigurable Physical Unclonable Functions. IEEE Trans Info Forensics Sec. 2014;9(6):921-32.
Zheng et al., How to Construct Efficient Signcryption Schemes on Elliptic Curves. Inf Proc Lett. 1998;68(5):227-33.
Zheng, Digital Signcryption or How to Achieve Cost(Signature & Encryption) « Cost(Signature) + Cost(Encryption). Advances in Cryptology. CRYPTO '97. 1997;1294:165-79.
U.S. Appl. No. 15/613,088, filed Jun. 2, 2017, Wallrabenstein et al.
U.S. Appl. No. 15/615,634, filed Jun. 6, 2017, Wallrabenstein et al.
U.S. Appl. No. 15/615,641, filed Jun. 6, 2017, Wallrabenstein et al.

* cited by examiner

SYSTEM AND DEVICE BINDING METADATA WITH HARDWARE INTRINSIC PROPERTIES

RELATED APPLICATIONS

This Application claims the benefit under 35 U.S.C. § 120 of U.S. application Serial No. 14/704,963, entitled "SYSTEM AND DEVICE BINDING METADATA WITH HARDWARE INTRINSIC PROPERTIES" filed on May 5, 2015. Application Ser. No. 14/704,963 claims priority under 35 U.S.C. § 119(e) to U.S. Provisional Application Ser. No. 62/017,045, entitled "METADATA BINDING TO PHYSICALLY UNCLONABLE FUNCTIONS" filed on Jun. 25, 2014, which application is herein incorporated by reference in its entirety. Application Ser. No. 14/704,963 claims priority under 35 U.S.C. § 119(e) to U.S. Provisional Application Ser. No. 61/988,848, entitled "AUTHENTICATION USING ELLIPTIC CURVES AND PHYSICALLY UNCLONABLE FUNCTIONS" filed on May 5, 2014, which application is herein incorporated by reference in its entirety.

BACKGROUND OF THE INVENTION

Authentication protocols generally rely on private information held by entities in order to establish identity. In traditional systems, the private data may consist of a username and password pair, personal identification numbers (PINs) or cryptographic keys. Multi-factor authentication protocols generally require two or more kinds of identifying information such as information the entity knows (e.g., a username and password), something the entity has (e.g. a smart card or token), and information representing what the entity is (e.g., a fingerprint).

Metadata comprises auxiliary information relating to the identity or state of an entity involved in authentication. Examples of metadata include biometric data, sensor output, global positioning data, passwords or PINs and similar auxiliary information that may be used to construct a characterization of an entitys identity or state. Biometric data comprises measurements of physical characteristics of a user (e.g., fingerprints, retina, iris, voice and vein patterns) that are adequately unique to be used as a proof of identity.

Systems that rely on sensor output, however, may be vulnerable to forged sensor output; and while biometric systems utilize a potent property for authentication, they can face challenges relating to the exposure and/or loss of sensitive biometric data. Since a sensor transforms a measured physical characteristic into a binary string, which is stored (enrolled) by the computer system and then compared to the binary strings subsequently generated by the sensor upon authentication requests, without further measures the system cannot distinguish between a string returned from the sensor and a string supplied by an adversary without the sensor. Thus for example an adversary may attempt to observe the output of a biometric sensor for a particular user and "clone" the user by supplying the surreptitiously-obtained biometric data to the system; An adversary may similarly attempt to clone a user by reading biometric data stored in the system. Further, since the features utilized in biometric systems tend definition to be substantially immutable, the compromise of a user's biometric data cannot be remedied in the way that a lost user password can simply be changed.

Characteristics that are unique and intrinsic to individual hardware devices (e.g., wire resistance, initial memory state, CPU instruction timing) can also be extracted and used as part of authentication protocols. A leading example of this is the physical unclonable function (PUF). A PUF function $f(c)$ maps an in out domain (or challenges) c to an output range (or response) r, where the mapping is defined based on characteristics unique to the device computing $f(\cdot)$. A circuit or hardware description of $f(\cdot)$ may be identical across all devices, yet the mapping from the domain to the range will be unique based on the specific hardware device executing the circuit computing $f(\cdot)$.

U.S. Pat. No. 8,577,091 to Ivanov et al. and U.S. Pat. No. 8,566,579 to Armstrong et al, describe authentication systems wherein intrinsic hardware characteristics (e.g., PUF output) as well as human biometrics are required to successfully complete an authentication, but neither provide a method for inexorably linking the PUF with the authentication or a method for handling non-sensitive sensor output.

Frikken et al. ("Robust Authentication using Physically Unclonable Functions," *Information Security*, volume 5735 of *Lecture Notes in Computer Science*, pages 26.2-Springer, 2009each) a method for combining metadata (e.g., PIN) into the input of a PUF, but does not provide an extension to arbitrary metadata (e.g., biometrics) or non-sensitive metadata (e.g., temperature, pressure).

Rust (editor) in "D1.1 Report on use case and architecture requirements," Holistic Approaches for Integrity of ICT-Systems (2013) mentions the idea of merging biometric features with a cell-based PULP but does not elaborate on a means for achieving this.

U.S. Patent Application Publication No. 20110002461 to Erhart et al, describes a method for authenticating sensor output by employing a PUF, which extracts unique characteristics of the physical sensor hardware. The method does not directly link the output of the sensor to the authentication of the hardware, however, and also requires that sensitive biometric sensor output leave the device.

SUMMARY OF THE INVENTION

An intrinsic identity of a device is constructed by generating an enrollment token or public key, which is based on intrinsic characteristics unique to the device such as a physical unclonable function (PUF). An authentication system utilizes the device's enrollment token or public key to verify the device's authenticity, preferably through a zero knowledge proof. Sensitive metadata is preferably also incorporated into the enrollment token or public key, which may be accomplished through an algorithmic means such as a hash function combining the metadata with hardware-intrinsic (e.g., PUF) data. The authentication may be interactive or non-interactive.

DETAILED DESCRIPTION OF EMBODIMENTS

Figure 1:
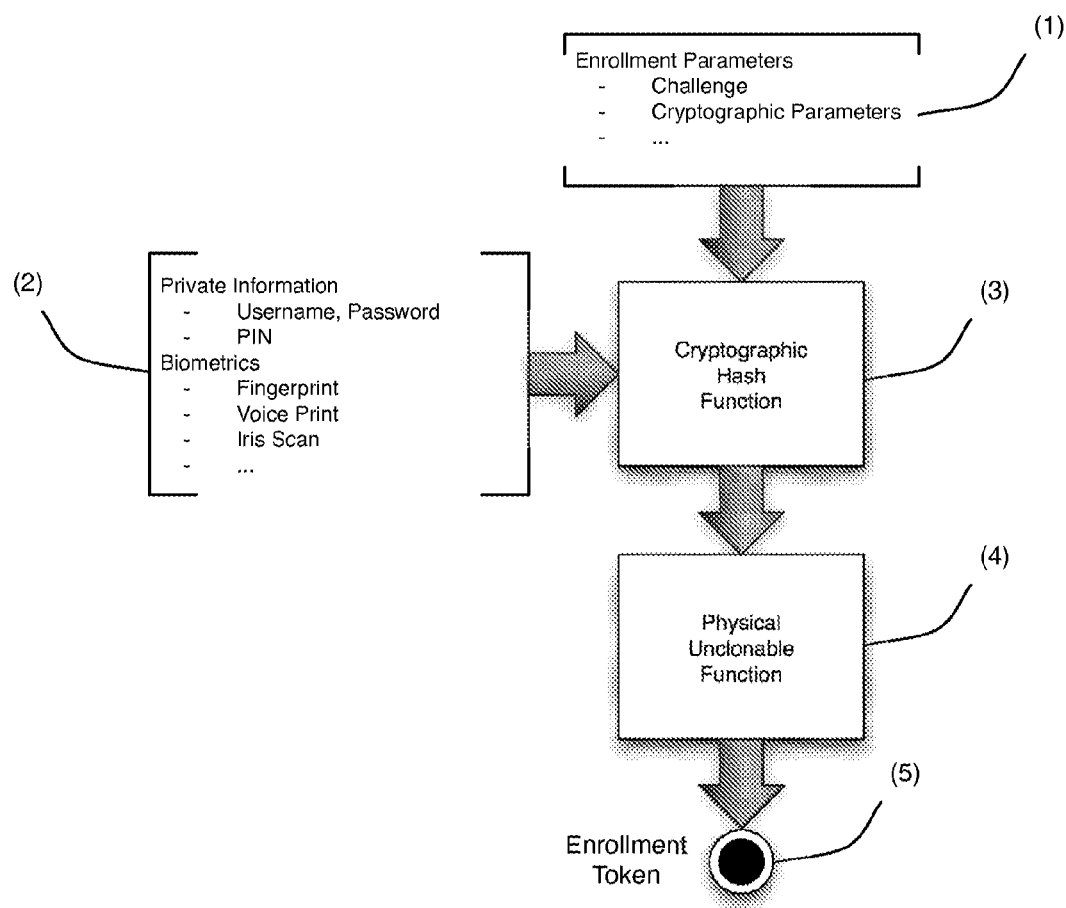
FIG. 1 is an illustration of the identity metadata binding operational flow.

Although the invention applies to the output of arbitrary sensors, an exemplary embodiment utilizing biometric sensors is described. The present invention is also described with reference to the example of an embodiment utilizing elliptic curve cryptography (including the associated terminology and conventions), but the inventive concept and teachings herein apply equally to various other cryptographic schemes such as ones employing different problems like discrete logarithm or factoring, and the invention is not limited by the various additional features described herein that may be employed with or by virtue of the invention. Before setting forth details of the invention, basic handling of PUF output, modeling assumptions, and primitives for PUF-based cryptographic schemes and threshold cryptography applicable to the example embodiment are described.

PUF output is noisy in that it varies slightly despite evaluating the same input. This is generally addressed with fuzzy extraction, a method developed to eliminate noise in biometric measurements. (See Juels et al., "A Fuzzy Commitment Scheme," *Proceedings of the 6th ACM conference on Computer and Communications Security*, CCS '99, pages 28-36, ACM, 1999). Fuzzy extraction may in part be employed within a device having a PUF such as within an auxiliary control unit, such that the output is constant for a fixed input. Fuzzy extraction (or reverse fuzzy extraction) may for example employ a "secure sketch," as described by Juels et al.

A secure sketch SS for in out string O, where ECC is a binary (n, k, 2t+1) error correcting code of length n capable of correcting t errors and $V \rightarrow \{0, 1\}^k$ is a k-bit value, may be defined as $SS(O; V = O \oplus ECC(V)$. This definition can be used to build a Gen algorithm, which outputs a set $\langle V, P \rangle$, where V is the value to be reconstructed and P is a helper string (which may be public) that is used to recover V.

---
Algorithm 1 Gen Algorithm
---
Input : A finite field $\mathbb{F}_n$ of order n; A challenge c
$O \leftarrow PUF(c)$
$V \in \mathbb{F}_n$
$P \leftarrow O \oplus ECC(V)$
return $\langle V, P \rangle$
---

Correspondingly, a Rep algorithm can be defined such that, on input O" within a maximum Hamming distance t of O, the original value V may be recovered. Rep(O", P), where D is the decoding scheme for the binary (n, k, 2t+1) error-correcting code ECC and O' is an input such that dist(O, O')≤t, can be defined as:

$$Rep(O', P) = D(P \oplus O')$$
$$= D(O \oplus ECC(V) \oplus O')$$
$$= V$$

This definition can then be used to build a Rep algorithm that allows a PUF output O' that differs from the original output O by at most t to reproduce output V such that Rep(O')=V using the helper string P=O ⊕ ECC(V):

---
Algorithm 2 Rep Algorithm
---
Input : A challenge c, Helper string P
$O' \leftarrow PUF(c)$
$V \leftarrow D(P \oplus O')$
return V
---

Gen and Rep algorithms such as these may be used in PUF-based protocols to ensure that the same value V is recovered so long as the PUF outputs O, O' differ by at most t bits, It is desirable that an adversary cannot predict a device's PUF response r for a challenge c with more than negligible probability (at least without physical access to the device), and that helper data does not reveal anything to an adversary about PUF responses. In assessing these security aspects, the following entities may be considered: a set of servers $\mathcal{S}$, where each server $s_i \in \mathcal{S}$ controls authentication of devices on its system; a set of devices $d_i \in \mathcal{D}$, each with an embedded PUF; and an adversary $\mathcal{A}$ that wishes to masquerade as a legitimate device $d_i \in \mathcal{D}$ to obtain resources stored on some subset of the servers $\mathcal{S}' \subseteq \mathcal{S}$. It may be assumed that all entities are bound to probabilistic polynomial-time (PPT), i.e., can only perform computation requiring polynomially many operations with respect to a global security parameter λ (which refers to the number of bits in the relevant parameter). Computation requiring exponentially many operations with respect to λ is not efficient for the agents, and will succeed with only negligible probability.

Games can be employed to assess a PPT adversary s advantage in (1) predicting a PUF's output, and (2) distinguishing helper data from a truly random string. It is sufficient to require that an adversary's advantage in a game is negligible with respect to the security parameter of the protocol, where a function $f(x): \mathbb{N} \mapsto \mathbb{R}$ is negligible if for every positive polynomial $p(\cdot)$ and sufficiently large x, the absolute value of $f(x)$ is less than $1/p(x)$. Although we describe exemplary games for capturing properties (1) and (2), they may be substituted for other game formulations designed to capture the concepts.

The unpredictability of a PUF can be assessed through the following game between an adversary $\mathcal{A}$ and a PUF device P: $\{0, 1\}^{\kappa_1} \mapsto \{0, 1\}^{\kappa_2}$ mapping input strings from the challenge space $\mathcal{C}_P$ of length $\kappa_1$ to the response space $\mathcal{R}_P$ of length $\kappa_2$ where λ is the security parameter for the protocol, given in unary as $\lambda$.

---
Protocol 1: PUF-PRED: PUF Prediciton Game
---
| Adversary $\mathcal{A}$ | | PUF Device P |
|---|---|---|
| (1) $c_i \in \bar{\mathcal{C}}_P \subset \mathcal{C}_P$, $0 \leq i \leq poly(\lambda)$ | → | |
| | ← | $r_i = P(c_i) \in \mathcal{R}_P$ (2) $\mathcal{R}_P \subset \mathcal{R}_P$, $0 \leq i \leq poly(\lambda)$ |
| (3) Challenege $c \notin \mathcal{C}_P$ | → | |
| (4) $c_i' \in \bar{\mathcal{C}}_P'$, $c \notin \mathcal{C}_P'$, $0 \leq i \leq poly(\lambda)$ | → | |
| | ← | $r_i' = P(c_i') \in \mathcal{R}_P'$ (5) $\mathcal{R}_P' \subset \mathcal{R}_P$, $0 \leq i \leq poly(\lambda)$ |
| (6) Guess $r' \stackrel{?}{\leftarrow} P(c)$ | → | |
---

The game proceeds as follows:
1. The adversary $\mathcal{A}$ issues polynomially many (w.r.t. the security parameter λ) challenges $c_i \in \mathcal{C}_P$ to the PUF device P, where the challenge set $\bar{\mathcal{C}}_P$ is a proper subset of the entire challenge space $\mathcal{C}_P$.
2. The PUF device P returns the responses $\{r_i | r_i \leftarrow P(c_i)\}$ to $\mathcal{A}$.
3. The adversary $\mathcal{A}$ eventually outputs a challenge c that was not in the original set of challenge queries $\bar{\mathcal{C}}_P$, The adversary is not allowed to query the PUF device P on the committed challenge c.

4. The adversary A may once again issue a new set of polynomially many challenges $c'_i \in \bar{C}'_P$ to the PUF device P. The adversary is not allowed to query the PUF device P on the committed challenge c.
5. The PUF device P returns the responses $\{r'_i | r'_i \leftarrow P(c'_i)\}$ to $\mathcal{A}$.
6. The adversary A eventually outputs a guess r' for P's response to the committed challenge c.

The probability of the adversary A guessing the correct response of the PUF P to the challenge c is then $\text{Adv}_{\mathcal{A}}^{\text{PUF-PRED}}(\kappa_2):=\Pr[r=r']$. That is, the adversary only wins the game when A's guess r' is equal to P's actual response $r \leftarrow P(c)$ to A's committed challenge c. (Technically, the PUF's output is noisy and will vary slightly on any fixed input. Thus, the equality is taken with respect to the output of a fuzzy extractor (e.g., Dodis et al.).).

In the PUF indistinguishability game, an adversary A is asked to differentiate between the output r of the fuzzy extractor for a PUF P and a randomly chosen string $s \in \{0, 1\}^l$ of the same length l.

Protocol 2: PUF - IND: PUF Indistinguishability Game

| Adversary $\mathcal{A}$ | | PUF Device P | |
|---|---|---|---|
| (1) | $c_i \in \mathcal{CH} \subset \mathcal{C}_P$, $0 \le i \le \text{poly}(\lambda)$ | $\rightarrow$ | $(R_i, H_i) \leftarrow$ Gen($r_i = P(c)$) |
| | | $\leftarrow$ | $H_i \in \mathcal{R}_P \subset \mathcal{R}_P$, $0 \le i \le \text{poly}(\lambda)$ (2) |
| (3) | $c_i \in \mathcal{CH} \subset \mathcal{C}_P$, $0 \le i \le \text{poly}(\lambda)$ | $\rightarrow$ | |
| | | $\leftarrow$ | $R_i \in \mathcal{R}_P \subset \mathcal{R}_P$, $0 \le i \le \text{poly}(\lambda)$ (4) |
| (5) | Challenge $c \notin \mathcal{CH}$ | $\rightarrow$ | $b \in \{0, 1\}$ |
| | | $\leftarrow$ | $b(s \in \{0, 1\}^l) +$ (6) $(1 - b)(R_i)$, $R_i = \text{Rep}(P(c), H_i)$ |
| (7) | $c'_i \in \mathcal{CH} \subset \mathcal{C}_P$, $c \ne c'_i$, $0 \le i \le \text{poly}(\lambda)$ | $\rightarrow$ | |
| | | $\leftarrow$ | $R'_i \in \mathcal{R}_P \subset \mathcal{R}_P$, $0 \le i \le \text{poly}(\lambda)$ (8) |
| (9) | Guess $b' \stackrel{?}{=} b$ | $\rightarrow$ | |

This game proceeds as follows:
1. Adversary $\mathcal{A}$ executes the enrollment phase on any challenge $c_i \in \mathcal{C}_P$.
2. The PUT device returns the corresponding helper string $H_i$ from the output of Gen. Denote this set of challenge-helper pairs $(c_i, H_i)$ as $\mathcal{CH}$.
3. Adversary $\mathcal{A}$ now requests the PUF response $r_i = P(c_i)$ for any $c_i \in \mathcal{CH}$. Denote the set of requested challenges in this step $\mathcal{CH}$.
4. For all requests $c_i \in \mathcal{CH}$, the PUF device returns the set $\{r_i | r_i \leftarrow P(c_i)\}$.
5. Adversary A selects a challenge $c \notin \mathcal{CH}$, such that A has $H_i$ but not $R_i$ for c. The PUF device chooses a bit $b \in \{0, 1\}$ uniformly at random.
6. If b=0, A is given $R_i = \text{Rep}(P(c)=r_i, H_i)$. Otherwise, if b=1 then A is given a random string $s \in \{0, 1\}^l$.
7. Adversary A is allowed to query the PUF device for $c'_i \in \mathcal{CH}$ so long as no $c'_i = c$.
8. For all requests $c'_i \ne c$, the PUF device returns the set $\{r'_i | r'_i \leftarrow P(c'_i)\}$.
9. The adversary outputs a guess bit b', and succeeds when b'=b.

Types of PUFs

Rührmair et al. ("Modeling Attacks on Physical Unclonable Functions," *Proceedings of the 17th ACM conference on Computer and communications security*, CCS '10, pages 237-249, ACM, 2010) define three distinct classes of PUF devices:

1. A Weak PUF is typically used only to derive a secret key. The challenge space may be limited, and the response space is assumed to never be revealed. Typical constructions include the SRAM (Holcomb et al., "Initial SHAM State as a Fingerprint and Source of True Random Numbers for MD Tags," *In Proceedings of the Conference on RFID Security*, 2007), Butterfly (Kumar et al., "Extended abstract: The Butterfly PUF Protecting IP on Every FPGA," *IEEE International Workshop on Hardware-Oriented Security and Trust*, pages 67-70, 2008), Arbiter (Lee et al., "A technique to build a secret key in integrated circuits for identification and authentication applications," *IEEE Symposium on VLSI Circuits: Digest of Technical Papers*, pages 176-179, 2004), Ring Oscillator (Suh et al., "Physical Unclonable Functions for Device Authentication and Secret Key Generation," *Proceedings of the 44th, annual Design Automation Conference*, DAC '07, pages 9-14. ACM, 2007), and Coating (Tuyls et al., "Read-Proof Hardware from Protective Coatings," *Proceedings of the 8th international conference on Cryptographic Hardware and Embedded Systems*, CHES'06, pages 369 383, Springer, 2006) PUFs.

2. A Strong PUF is assumed to be (i) physically impossible to clone, (ii) impossible to collect a complete set of challenge response pairs in a reasonable time (typically taken to be on the order of weeks), and (iii) difficult to predict the response to a random challenge. For example, the super-high information content (SHIC) PUF described by Rührmair ("Applications of High-Capacity Crossbar Memories in Cryptography," *IEEE Trans. Nanotechnol.*, volume 10, no. 3:489-492, 2011) may be considered a Strong PUF.

3. A Controlled PUF satisfies all of the criteria for strong PUFs, and additionally implements an auxiliary control unit capable of computing more advanced functionalities to cryptographically augment protocols. A controlled PUF should ideally satisfy the five conditions below.

One definition for an ideal physical unclonable function $P_d: \{0, 1\}^{\kappa_1} \rightarrow \{0, 1\}^{\kappa_2}$ bound to a device d that the function preferably exhibits the following properties:

1. Unclonable: Ideally, $\Pr[\text{dist}(y, x) \le t | x \leftarrow U_{\kappa_1}, y \leftarrow P(x), z \leftarrow P'] \le \epsilon_1$, the probability of duplicating PUF P with a clone PUF P', such that their output distributions are t-statistically close is less than some sufficiently small $\epsilon_1$.

2. Unpredictable: Ideally, $\text{Adv}_{\mathcal{A}}^{\text{PUF-PRED}}(\kappa_2):=\Pr[r=r']$, denoting the probability of the adversary $\mathcal{A}$ guessing the correct response r of the PUF P to the challenge c, is negligible in $\kappa_2$ for all probabilistic polynomial time (PPT) adversaries $\mathcal{A}$. This refers to the decisional variant of the PUF unpredictability game described in Protocol 1.

3. Robust: Ideally, $\Pr[\text{dist}(y, z) > t | x \leftarrow U_{\kappa_1}, y \leftarrow P(x), z \leftarrow P(x)] \le \epsilon_2$, i.e., the probability of a fixed PUF P yielding, responses t:-distant on the same input x is less than some sufficiently small $\epsilon_2$. This property is satisfied by binding the PUF device d with a (m, l, t, $\epsilon_3$) fuzzy extractor (Gen, Rep).

4. Fuzzy Extraction: Ideally, during the enrollment phase for a noisy PUF P, given a challenge c, the PUF computes (R, H)←Gen(r), where r←$P_d$(c) and outputs H. The helper string H allows for R to be recovered when the challenge r' is t-close to the original challenge r.

5. Indistinguishability ideally, the output of the PUF is computationally indistinguishable from a random string of the same length, such that the advantage of a PPT adversary $\mathcal{A}$ is $\mathrm{Adv}_{\mathcal{A}}^{\mathrm{PUF-PRED}}$ (l)≤½+$\epsilon_3$, where $\epsilon_3$ is negligible. This requires that the adversary distinguishes between a random string, s, and the output of the fuzzy extractor, $R_i$, with probability at most negligibly more than ½. Thus, $\mathrm{Adv}_{\mathcal{A}}^{\mathrm{PUF-PRED}}$ −½≤$\epsilon_3$, where $\epsilon_3$ is negligible.

However, alternate definitions (e.g., Mori et al., "Quantitative and Statistical Performance Evaluation of Arbiter Physical Unclonable Functions on FPGAs," 2010 *International Conference on Reconfigurable Computing and FPGAs (ReConFig)*, pages 298-303, 2010; Maiti, *A Systematic Approach to Design an Efficient Physical Unclonable Function*, dissertation, Virginia Tech 2012) for an ideal physical unclonable function may be substituted.

In the example of an embodiment employing elliptic curve cryptography, Algorithms 3 and 4 below can be used to allow a PUF-enabled device to locally store and retrieve a sensitive value without storing any sensitive information in non-volatile memory. Algorithm 3 illustrates the storing of a sensitive value $\mathcal{V}$ using a PUF, and Algorithm 4 illustrates the dynamic regeneration of $\mathcal{V}$. The challenge $c_i$ and helper data $\mathrm{helper}_i$ can be public, as neither reveals anything about the sensitive value $\mathcal{V}$. While the present example uses encryption of $\mathcal{V}$ by exclusive-or, ⊕, $\mathcal{V}$ could also be used as a key to other encryption algorithms (e.g., AES) to enable storage and retrieval of arbitrarily sized values.

---
Algorithm 3 PUF-Store
---

Goal: Store value $\mathcal{V}_i$
for PUF Device d do
    Select finite field $\mathbb{F}_p$ of order p
    Select E, an elliptic curve over $\mathbb{F}_p$
    Find G ∈ E/$\mathbb{F}_p$, a base point of order q
    Select challenge $c_i$ ∈ $\mathbb{F}_p$
    x = H($c_i$,E,G,p,q)
    O = PUF(x)
    $\mathrm{helper}_i$ = $P_i$ = O ⊕ ECC($\mathcal{V}_i$)
    Write {$c_i$,$\mathrm{helper}_i$} to non-volatile memory
end for ---
Algorithm 4 PUF-Retrieve
---

Goal: Retrieve value $\mathcal{V}_i$
for PUF Device d do
    Read {$c_i$,$\mathrm{helper}_i$} from non-volatile memory
    x ← H($c_i$,E,G,p,q)
    O' = PUF(x)
    $\mathcal{V}_i$ ← D((ECC($\mathcal{V}_i$) ⊕ O) ⊕ O')
end for Whenever O and O' are l-close, the error correcting code ECC can be passed to a decoding algorithm D which will recover the sensitive value $\mathcal{V}$.

Enrollment

In order to construct an intrinsic identity of a device, a public representation of the device's identity (referred to here as an enrollment token or public key) must be generated. In this process of device enrollment, a cryptographic enrollment token is collected from the device. An elliptic curve mathematical framework for enrollment and authentication may be used, but those skilled in the art will realize that other embodiments (e.g., discrete logarithm frameworks, in which regard U.S. Pat. No. 8,918,647 is incorporated. here by reference) will provide the same functionality. Using Algorithm 5, a local device can perform an enrollment protocol using the PUF.

This allows each PUF circuit to generate a local public key $p_i^{pub}$, which is useful for bootstrapping more complex key setup algorithms. When the key setup algorithm is performed internal to the device (rather than externally among a set of distinct devices, this bootstrap process may not be necessary.

---
Algorithm 5 Enrollment Algorithm
--- for Device d do
    $c_i$ ∈ $\mathbb{F}_p$, a group element
    x = H($c_i$,E,G,p,q)
    O = PUF(x)
    $\mathrm{helper}_i$ = O ⊕ ECC($p_i^{priv}$ mod q)
    $p_i^{pub}$ = $A_i$ = $p_i^{priv}$ · G mod p
    Store {$p_i^{pub}$,$c_i$,$\mathrm{helper}_i$}
end for Zero Knowledge Roofs A zero knowledge proof (ZKP) of knowledge is a method for proving that a given statement is true, while revealing nothing beyond this fact. The Z KP is an interaction between two parties: a prover $\mathcal{P}$ wishes to establish the validity of a statement, and a verifier $\mathcal{V}$ that must be convinced the statement is true. At the conclusion of the protocol, the verifier should be convinced with overwhelming probability that a true statement is indeed true. Correspondingly, an adversary should only succeed in convincing the verifier of a false statement with negligible probability. The proof is zero knowledge in the sense that the verifier could not use the messages from a previous proof to convince a new party of the statement's validity, and the messages reveal only a single bit of information: whether or not the prover $\mathcal{P}$ possesses the secret. There are two general classes of zero knowledge proofs: interactive ZKPs, where a series of messages are exchanged between the prover $\mathcal{P}$ and verifier $\mathcal{V}$, and non-interactive ZKPs, where the prover $\mathcal{P}$ publishes a single message $\mathcal{M}$ without interaction with $\mathcal{V}$, yet $\mathcal{V}$ is convinced that $\mathcal{P}$ possesses the secret.

The requirement for communication from the verifying server in an interactive zero knowledge proof is to obtain a nonce value specific to the current proof. This prevents an eavesdropping adversary from using previous proofs from a valid device to successfully complete an authentication protocol and masquerade as the device. A non-interactive zero knowledge proof removes this communication requirement, and allows the proof to be completed without interacting with the verifying end point.

Achieving a non-interactive construction requires the proving device to generate the nonce on behalf of the verifier in a manner that prevents the proving end device from manipulating the proof. One method for constructing a lion interactive zero knowledge proof is for the device to construct a nonce N as N←H(A||τ), where A is the device's public key, H(·) is a cryptographic hash function, τ is a timestamp and x||y denotes concatenation of x and y. The timestamp ensures that previous proofs constructed by the proving device cannot be replayed by an adversary in the future, while the hash function ensures that the proving device cannot manipulate the nonce in an adversarial manner. The reliance on timestamnps is substantially less onerous than reliance on globally synchronized clocks. That is, the timestamp need not match the current timestamp on arrival at the prover exactly, which eliminates the potential of network delay to affect the proof. Rather, the verifying end point checks that the timestamp is reasonably current (e.g., second granularity) and monotonically increasing to prevent replay attacks. An exemplary non-interactive zero knowledge proof for a PUF-enabled device is described in Algorithm 6.

---
Algorithm 6 Non-Interactive Authentication Algorithm
---
for PUF Device d do
    $\mathcal{V}_i \leftarrow$ PUF-Retrieve($c_i$, $h_i$)
    $A_i = \mathcal{V}_i \cdot G \bmod p$
    $r \leftarrow$ random $\in \mathbb{F}_n$, a random group element
    $B \leftarrow r \cdot G \bmod p$
    $N \leftarrow$ Hash($A \| \tau$) where $\tau$ is the current timestamp
    $c \leftarrow$ Hash($G$, $B$, $A$, $N$)
    $m \leftarrow r + c \cdot \mathcal{V}_i \bmod q$
    Server $s \leftarrow \{B, m, \tau\}$
end for
for Server s do
    $A_i = \mathcal{V}_i \cdot G \bmod p$ (public key stored from device enrollment)
    Verify $\tau$ is reasonably current (e.g., $\tau$ = current time $-\epsilon$)
    $N \leftarrow$ Hash($A \| \tau$)
    $c' \leftarrow$ Hash($G$, $B$, $A$, $N$)
    $P \leftarrow m \cdot G - c' \cdot A \bmod p$ Device d $\leftarrow \begin{cases} \text{accept: } P = B \\ \text{deny: } P \neq B \end{cases}$ end for

---

Hash Functions

In general, a hash function is defined as $H(\cdot): \{0,1\}^* \mapsto \{0, 1\}^\lambda$, where $\lambda$ is a fixed constant. That is, a hash function $H(\cdot)$ (or written explicitly as Hash($\cdot$)) takes an input of arbitrary size, and maps to a finite output domain. For cryptographic settings, hash functions must satisfy additional properties. In the context of binding metadata in authentication protocols, the following are particularly relevant:

1. One-Way: computationally infeasible to determine the input x when given the output H(x).
2. Collision Resistant: computationally infeasible to find a pair $\{(z, y) | x \neq y, H(x) = H(y)\}$.
3. Avalanche Condition: each bit of $H(\bar{x})$ is complemented from H(x) with probability ½, where x is any hash input and $\bar{x}$ is x with a single bit complemented.

The one-way property ensures that the output H(x) does not reveal anything about the input x. The collision resistant property ensures that it is computationally infeasible to provide a different set of metadata y such that H(x)=H(y), where x is the proper metadata for a given entity. The avalanche condition ensures that the output H(x) changes substantially in response to a minor change to the input x, which allows any change to the metadata to be detected and force a failed authentication.

Metadata Binding

Let metadata binding refer to the process of incorporating auxiliary metadata into the authentication process. Metadata is arbitrary auxiliary information upon which the authentication protocol should depend. That is, without the correct metadata, the authentication should fail. Metadata may be characterized as either sensitive or non-sensitive, where sensitive metadata should not leave the device (e.g., password, PIN, biometric) and non-sensitive metadata may leave the device (e.g., sensor output on temperature, pressure).

Sensitive metadata is incorporated into the public identity token created during enrollment. For example, when no sensitive metadata is provided, device enrollment outputs a public identity that characterizes only the device. However, when sensitive metadata is provided during enrollment (e.g., biometrics, PIN, etc.), the public identity characterizes both the device and the sensitive metadata. One embodiment of the invention never requires the sensitive metadata to leave the device, as the zero knowledge proof protocol is completed without the verifier having access to the sensitive metadata.

Non-sensitive metadata is not incorporated into the enrollment process. Thus, the public identity output from enrollment does not depend on non-sensitive metadata (e.g., sensor output for temperature, pressure, etc.). Rather, non-sensitive metadata is incorporated into the zero knowledge proof protocol, such that the proof of device and/or user authenticity is only valid if the corresponding non-sensitive metadata is also provided to the verifier. This allows the device and/or user to have a single public identity, and yet a verifier given access to the non-sensitive metadata can verify both the authenticity of the device and/or user as well as the origin of the metadata.

FIG. 1 illustrates the process flow of metadata binding. First, Enrollment Parameters 1 are retrieved and may be combined with Identity Metadata, 2 through a Cryptographic Hash Function 3. The output of the cryptographic hash function is used as input to the Physical Unclonable Function 4, which links the enrollment parameters and optional metadata to the hardware identity. Finally, an Enrollment Token 5 is returned as a function of the PUF output.

Due to the avalanche property of hash functions (where a single bit difference in the input results in each bit of the output flipping with approximately 50% probability), the metadata must be exactly the same in order for the authentication to succeed. However, the exemplary embodiment of biometric authentication frequently results in noise, where scans differ slightly despite observing the same characteristic (e.g., fingerprint, iris, etc.). Thus, means such as a fuzzy extractor may preferably be employed to ensure that the biometric reliably returns a constant value. For example, a constant value $\mathcal{D}_i$ for the metadata may be chosen and linked to an associated public helper data value $h_i^{\mathcal{M}}$. A noisy biometric scan $\mathcal{S}$ can then be used to compute $h_i^{\mathcal{M}} \leftarrow$ ECC $(\mathcal{M}_i) \oplus \mathcal{S}$ where ECC is an error correcting code, and given access to a new biometric scan $\tilde{\mathcal{S}}$ that is t-close to $\mathcal{S}$ the constant value $\mathcal{D}_i$ can be recovered by computing $\mathcal{M}_i \leftarrow D(h_i^{\mathcal{M}} \oplus \tilde{\mathcal{S}}$, where D is the corresponding error decoding algorithm.

Incorporating metadata into the construction requires redefining the PUF-Store functionality described in Algorithm 3. Algorithm 7 provides an example of how metadata $\mathcal{D}_i$ may be hashed into the PUF input x, which is used to protect the committed value $\text{Adv}_A^{\text{PUF-PRED}}$.

Algorithm 7 PUF-Store-Metadata

Goal: Store value $\mathcal{V}$ requiring Sensitive Metadata $\mathcal{M}_i$
for PUF Device d do
    Select finite field $\mathbb{F}_p$ of order p
    Select E, an elliptic curve over $\mathbb{F}_p$
    Find $G \in E/\mathbb{F}_p$, a base point of order q
    Select challenge $c_i \in \mathbb{F}_p$
    $x = H(c_i, \mathcal{M}_i, E, G, p, q)$
    O = PUF(x)
    helper$_i$ = $P_i$ = O $\oplus$ ECC($\mathcal{V}$)
    Write $\{c_i, \text{helper}_i\}$ to non-volatile memory
end for While in the present example the PUF in gut consists of a hash of a challenge value, a metadata value, the elliptic curve E, base point G, and moduli p and q, various other permutation of values (pertinent to the mathematical framework used) may be hashed to produce a PUF input incorporating metadata in other embodiments. Moreover, one or more values can be iteratively hashed and/or hashed values can be nested (e.g., $H(H(c_i \| \mathcal{M}_i), E, G, p, q)$, etc.). Further, other methods for linking and/or combining the parameters (e.g., an all-or-nothing transformation) may be employed.

Similarly, the PUF-Retrieve functionality described in Algorithm 4 must be modified to require the sensitive metadata $\mathcal{M}$ in order to recover the committed value $\mathcal{V}$. Algorithm 8 describes how metadata $\mathcal{M}_i$ in combination with the PUF is used to recover the committed value $\mathcal{V}$.

Algorithm 8 PUF-Retrieve-Metadata

Figure 2:
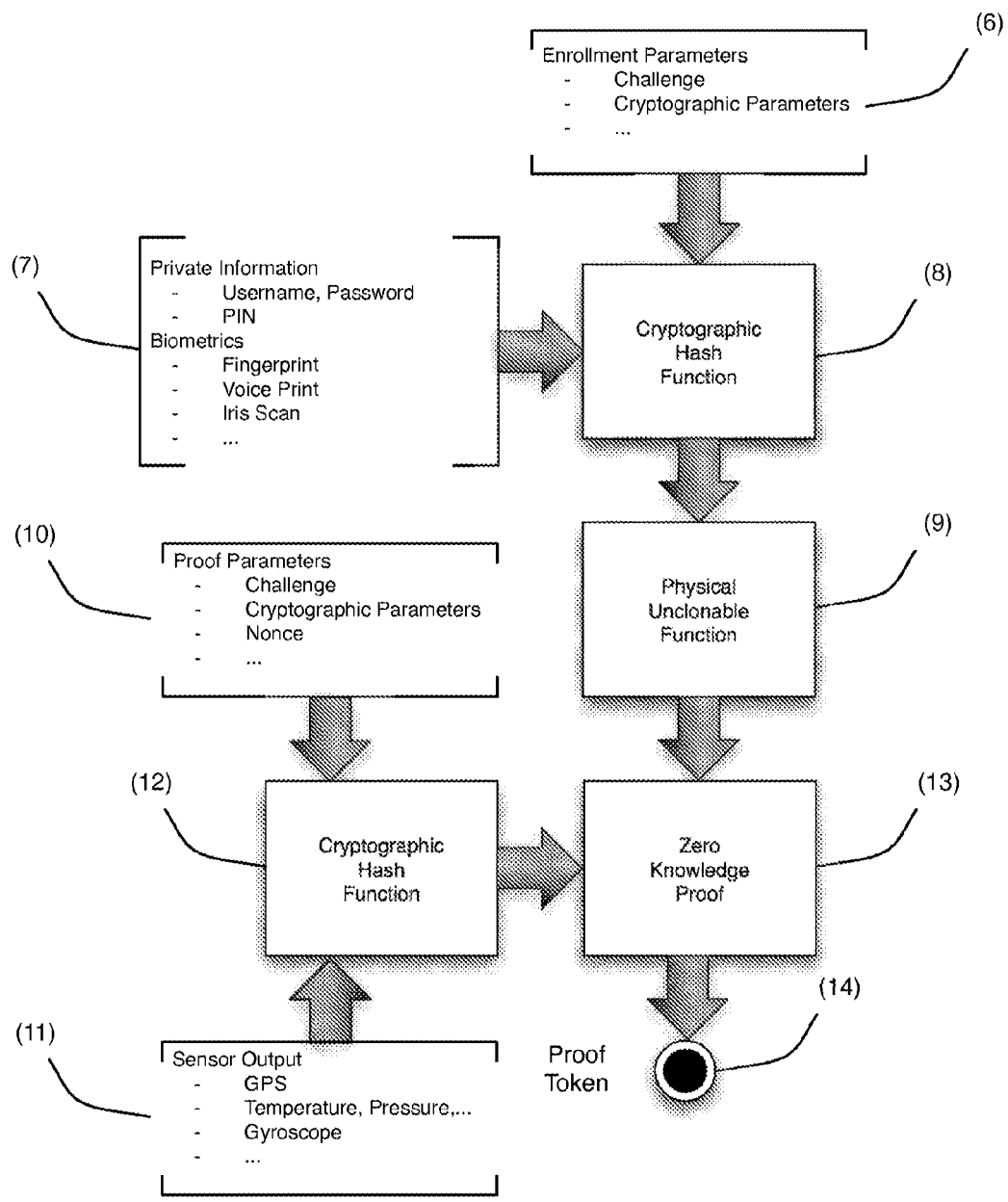
FIG. 2 is an illustration of the zero knowledge proof generation for arbitrary sensor output.

Goal: Retrieve value $\mathcal{V}$
for PUF Device d do
    Read $\{c_i, \text{helper}_i\}$ from non-volatile memory
    $x \leftarrow H(c_i, \mathcal{M}, E, G, p, q)$
    O' = PUF(x)
    $\mathcal{V} \leftarrow D((\text{ECC}(\mathcal{V}) \oplus O) \oplus O')$
end for Non-Interactive Zero Knowledge Proof Binding Metadata Returning to the exemplary embodiment of biometric authentication (e.g., fingerprint scanner), FIG. 2 illustrates the process flow of constructing a zero knowledge proof demonstrating sensor integrity, user authentication, and sensor output verification. First, Enrollment Parameters 6 are retrieved and may be combined with Identity Metadata 7 through a Cryptographic Hash Function 8. The output of the cryptographic hash function is used as input to the Physical Unclonable Function 9, which links the enrollment parameters and identity metadata to the hardware identity. Next, the Proof Parameters 10 and Sensor Output 11 are linked through a Cryptographic Hash Function 12. The output of Physical Unclonable Function 9 and Cryptographic Hash Function 12 are synthesized to generate a Zero Knowledge Proof 13, which outputs a Proof Token 14 that will convince a verifier of the integrity of the sensor, authenticate the user, and validate the sensor output.

Algorithm 9 provides an example of how a fingerprint scan may be bound to the authentication protocol such that both the device and fingerprint must match those originally enrolled. Non-sensitive metadata (e.g., sensor output for temperature, pressure, etc.) $\mathcal{M}_i^{pub}$ may be incorporated into the non-interactive authentication algorithm by incorporating it into the construction of the nonce N, and providing $\mathcal{M}_i^{pub}$ to the verifier. Thus, the verifier is only able to construct the nonce N (and, consequently, the variable c') if $\mathcal{M}_i^{pub}$ matches the output from the sensor.

Algorithm 9 Device & Fingerprint Authentication Algorithm for User do
    Scan Fingerprint
    $\overline{\text{FP}} \leftarrow$ Scan
    Read Fingerprint Helper Data $h_i^{\mathcal{M}}$
    $\mathcal{M}_i^{FP} \leftarrow \text{ECC}(h_i^{\mathcal{M}} \oplus \overline{\text{FP}})$
end for
for PUF Device d do
    $\mathcal{V}_i \leftarrow$ PUF-Retrieve($c_i$, $\mathcal{M}_i^{FP}$, $h_i$)
    $A_i = \mathcal{V}_i \cdot G \mod p$
    $r \leftarrow$ random $\in \mathbb{F}_n$, a random group element
    $B \leftarrow r \cdot G \mod p$
    $N \leftarrow \text{Hash}(A \| \mathcal{M}_i^{pub} \| \tau)$ where $\tau$ is the current timestamp
    $c \leftarrow \text{Hash}(G, B, A, N)$
    $m \leftarrow r + c \cdot \mathcal{V}_i \mod q$
    Server $s \leftarrow \{B, m, \mathcal{M}_i^{pub}, \tau\}$
end for
for Server s do
    $A_i = \mathcal{V}_i \cdot G \mod p$ (public key stored from device enrollment)
    $N \leftarrow \text{Hash}(A \| \mathcal{M}_i^{pub} \| \tau)$
    $c' \leftarrow \text{Hash}(G, B, A, N)$
    $P \leftarrow m \cdot G - c' \cdot A \mod p$ Device d $\leftarrow \begin{cases} \text{accept: } P = B \\ \text{deny: } P \neq B \end{cases}$ end for First, a user's fingerprint scan $\overline{\text{FP}}$ is used in combination with the helper data, $h_i^{\mathcal{M}}$ for the original fingerprint scan FP to recover the metadata value $\mathcal{M}$. Next, the metadata value $\mathcal{M}_i$ is used as input to the PUF, such that the PUF output depends on the metadata. In order to bind non sensitive metadata $\mathcal{M}_i^{pub}$ to the proof, it is used to construct the nonce N, which depends on the public identity A as well as the current timestamp $\tau$ (which prevents replay attacks). The non-sensitive metadata $\mathcal{M}_i^{pub}$ is then provided to the verifier, as it is now necessary to verify the proof. (If the non-sensitive metadata should only be revealed to the verifier, it may be sent encrypted). Finally, the device constructs the non-interactive zero knowledge proof, which enables the server to verify if both the device and (sensitive and non-sensitive) metadata are correct.

A non-interactive zero knowledge proof may also be constructed by requiring the server to issue a nonce N to the device. This exemplary construction is illustrated in Algorithm 10.

Algorithm 10 Interactive Device & Fingerprint Authentication Algorithm for Server s do
    Send nonce $N \in \{0, 1\}^\lambda$ to Device, where $\lambda$ is the number of bits in the modulus p
end for
for User do
    Scan Fingerprint
    $\overline{\text{FP}} \leftarrow$ Scan
    Read Fingerprint Helper Data $h_i^{\mathcal{M}}$
    $\mathcal{M}_i^{FP} \leftarrow \text{ECC}(h_i^{\mathcal{M}} \oplus \overline{\text{FP}})$
end for
for PUF Device d do
    $\mathcal{V}_i \leftarrow$ PUF-Retrieve($c_i$, $\mathcal{M}_i^{FP}$, $h_i$)
    $A_i = \mathcal{V}_i \cdot G \mod p$
    $r \leftarrow$ random $\in \mathbb{F}_n$, a random group element
    $B \leftarrow r \cdot G \mod p$
    $c \leftarrow \text{Hash}(G, B, A, N)$
    $m \leftarrow r + c \cdot \mathcal{V}_i \mod q$
    Server $s \leftarrow \{B, m, \mathcal{M}_i^{pub}\}$
end for -continued Algorithm 10 Interactive Device & Fingerprint Authentication Algorithm for Server s do
   $A_i = V_i \cdot G \bmod p$ (public key stored from device enrollment)
   $c' \leftarrow \text{Hash}(G, B, A, N)$
   $P \leftarrow m \cdot G - c' \cdot A \bmod p$ Device $d \leftarrow \begin{cases} \text{accept: } P = B \\ \text{deny: } P \neq B \end{cases}$ ends for The addition of (sensitive and/or non-sensitive) metadata is optional in embodiments of the invention. That is, non-sensitive metadata may be included while sensitive metadata is excluded. This requires only that the public identity token did not incorporate the sensitive metadata. Similarly, sensitive metadata may be included while non-sensitive metadata is excluded. This requires only that the nonce is not constructed using non-sensitive metadata.

Extension to Role Based Access Control

As one embodiment of our invention relies on an elliptic curve mathematical framework, one skilled in the art will realize that it may be extended to support cryptographically-enforced role based access control (RBAC). That is, data access policies and device credentials may be specified mathematically, and the RBAC algorithm computes a function $f(\mathcal{P}, \mathcal{C}) \mapsto \{0, 1\}$ mapping policies $\mathcal{P}$ and credentials $\mathcal{C}$ to an access decision in $\{0, 1\}$. This is typically accomplished by constructing a bilinear pairing (e.g., Weil or Tate pairing), and is a natural extension of our invention.

While the foregoing embodiments have been described with various features, one of ordinary skill in the art will recognize that, the authentication protocol need not be limited to zero knowledge, and could be based on other cryptographic constructions for establishing identity. For example, the device could use its hardware identity to digitally sign the contents of a packet, and include this signature in the packet header (e.g., TCP Options Header, where an example header would include $\{B=r\cdot G \bmod p, m=r+\text{Hash}(G, B, A, N)\cdot\text{rand} \bmod q, \tau\}$) and the hardware identity may be applied to a variety of other cryptographic authentication techniques, and need not be limited by the zero knowledge aspect of the example provided.

What is claimed is:

1. A multi-factor authentication device for binding metadata with hardware-intrinsic properties, the device comprising:
   a hardware root of trust constructed to generate a value characteristic to hardware-intrinsic properties of the hardware root of trust; and
   at least one processor connected to the hardware root of trust configured to:
      generate a binding value by combining device enrollment parameters associated with the device and first metadata associated with the device;
      communicate the binding value for input to the hardware root of trust and receive an output value from the hardware root of trust; and
      communicate, an authentication token for authentication, wherein the authentication token is generated as a function of the output value and incorporating second metadata.

2. The device of claim 1, wherein the at least one processor is configured to create the authentication token and incorporate second metadata having at least some different metadata than the first metadata.

3. The device of claim 1, wherein the at least one processor is further configured to perform a zero knowledge proof based on verifying a sensor or sensor output, in response to an authentication request from an external verifying entity.

4. The device of claim 1, wherein the at least one processor is further configured to perform a zero knowledge proof based on the authentication token incorporating the second metadata.

5. The device of claim 1, wherein the at least one processor is further configured to communicate the second metadata to a verifier configured to verify of an origin of the second metadata through the zero knowledge proof.

6. The device of claim 1, wherein the hardware root of trust includes an SRAM physical unclonable function (PUF).

7. The device of claim 1, wherein the at least one processor is further configured to access at least a portion of the first metadata or derive the at least a portion of the first metadata from a biometric sensor.

8. The device of claim 1, wherein the at least one processor is further configured to access at least a portion of the second metadata or derive the at least a portion of the second metadata from one or more environmental sensors.

9. A computer implemented method for binding metadata with hardware-intrinsic properties, the method comprising:
   generating, by a hardware root of trust, a value characteristic to hardware-intrinsic properties of the hardware root of trust;
   generating, by at least one processor, a binding value from device enrollment parameters associated with an authentication device and first metadata associated with the authentication device;
   communicating, by the at least one processor, the binding value for input to the hardware root of trust;
   receiving, by the at least one processor, an output value from the hardware root of trust; and
   communicating, by the at least one processor, an authentication token for authentication, generated as a function of the output value and incorporating second metadata.

10. The method of claim 9, further comprising an act of creating the authentication token as a function of the output value and incorporating second metadata having at least some different metadata than the first metadata.

11. The method of claim 9, wherein the method further comprises performing a zero knowledge proof based on verifying a sensor or sensor output, in response to an authentication request from an external verifying entity.

12. The method of claim 9, wherein the method further comprises performing a zero knowledge proof based on the authentication token incorporating the second metadata.

13. The method of claim 9, wherein the method further comprises communicating the second metadata to a verifier, and proving an origin of the second metadata through the zero knowledge proof.

14. The method of claim 9, wherein the method further comprises accessing the second metadata from one or more sensors connected to the multi-factor authentication device.

15. The method of claim 9, wherein the method further comprises accessing at least a portion of the first metadata or derive the at least a portion of the first metadata from a biometric sensor.

16. The method of claim 9, wherein the method further comprises accessing or deriving at least a portion of the second metadata from one or more environment sensors.

17. The method of claim 9, wherein the hardware root of trust includes a physical unclonable function ('PUF') circuit, and the method further comprising generating, by the PUF, an output value that is characteristic to the PUF.

18. At least one non-transitory computer-readable storage medium containing processor-executable instructions that, when executed, perform a method for binding metadata with hardware-intrinsic properties, the method comprising:
   generating a value characteristic to hardware-intrinsic properties of a hardware root of trust;
   generating a binding value from device enrollment parameters associated with an authentication device and first metadata associated with the authentication device;
   communicating the binding value for input to the hardware root of trust;
   receiving an output value from the hardware root of trust; and
   communicate an authentication token for authentication, generated as a function of the output value and incorporating second metadata.

19. The computer-readable storage medium of claim 18, wherein creating the authentication token as a function of the output value and incorporating second metadata includes incorporating second metadata having at least some different metadata than the first metadata.

20. The computer-readable storage medium of claim 18, wherein the method further comprises performing a zero knowledge proof including the second metadata in response to an authentication request from an external verifying entity.

* * * * *